US006738639B1

United States Patent
Gosselin

(10) Patent No.: US 6,738,639 B1
(45) Date of Patent: May 18, 2004

(54) REDUCING SIGNALING TRAFFIC WITH MULTICASTING IN A WIRELESS COMMUNICATION NETWORK

(75) Inventor: Jean-Francois Gosselin, Montreal (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/515,071

(22) Filed: Feb. 28, 2000

(51) Int. Cl.[7] .................................................. H04Q 7/20
(52) U.S. Cl. ......................... 455/519; 455/518; 455/524
(58) Field of Search .............................. 455/422, 426,
455/452, 453, 454, 458, 502, 503, 509,
515, 517, 518, 519, 524, 525; 370/388,
389, 390, 392, 395.3, 395.31, 395.52, 312,
328, 338, 349, 401

(56) References Cited

U.S. PATENT DOCUMENTS

| | | | | |
|---|---|---|---|---|
| 5,974,300 A | * | 10/1999 | LaPorta et al. | 340/7.23 |
| 6,058,308 A | * | 5/2000 | Kallin et al. | 455/432 |
| 6,128,472 A | * | 10/2000 | Harel et al. | 340/7.21 |
| 6,134,587 A | * | 10/2000 | Okanoue | 709/222 |
| 6,141,347 A | * | 10/2000 | Shaughnessy et al. | 370/390 |
| 6,154,463 A | * | 11/2000 | Aggarwal et al. | 370/408 |
| 6,252,862 B1 | * | 6/2001 | Sauer et al. | 370/331 |
| 6,298,058 B1 | * | 10/2001 | Maher et al. | 370/390 |

FOREIGN PATENT DOCUMENTS

| | | |
|---|---|---|
| EP | 0 624 859 A | 11/1994 |
| WO | WO 96 22666 A | 7/1996 |
| WO | WO 98 56206 A | 12/1998 |

OTHER PUBLICATIONS

M. Jonsson, "Ericsson Wireless LAN Systems", Ericsson Review No. 4, 1998.

J. Lundqvist and B. Svensson, "Messaging–Over–IP—A Network for Messaging and Information Services", Ericsson Review No. 3, 1999.

G. Saussy, "The AXI 540 Router and the Public IP Network Edge", Ericsson Review No. 4, 1999.

J. Borje, H. Lund and A. Wirkestrand, "Real–Time Routers for Wireless Networks", Ericsson Review No. 4, 1999.

C. Semeria and T. Maufer, "Introduction to IP Multicast Routing", http://www.3com.com/nsc/501303.html, printed Dec. 15, 1999.

V. Johnson and M. Johnson, "How IP Multicast Works", http://www.stardust.com/ipmulticast/community/whitepapers/howipmcworks.html, printed Dec. 15, 1999.

Standard Search Report for RS 104799US dated Sep. 6, 2000.

S. Deering, "Host Extensions for IP Multicasting", Aug. 1989, Network Working Group—Request for Comments.

* cited by examiner

Primary Examiner—Sinh Tran
Assistant Examiner—Jean A Gelin

(57) ABSTRACT

Signaling traffic communicated from a mobile switching center to a plurality of base stations is reduced by associating the plurality of base stations to form one or more multicast groups and assigning a multicast group address to each multicast group for use in multicast communications to the base stations within each multicast group. A network interface associated with each base station is configured to filter signaling traffic for multicast messages addressed to the multicast group to which the base station belongs. If the mobile switching center and the base stations are located on different subnetworks, multicast-enabled routers and/or filter switches are also configured to only route multicast messages over communication links that connect a corresponding multicast group member. The mobile switching center may then communicate a single multicast message to all base stations within a multicast group by using the multicast group's corresponding multicast group address.

37 Claims, 5 Drawing Sheets

REDUCING SIGNALING TRAFFIC WITH MULTICASTING IN A WIRELESS COMMUNICATION NETWORK

BACKGROUND OF THE INVENTION

1. Technical Field of the Invention

The present invention relates in general to the field of communication systems, and in particular, by way of example but not limitation, to reducing signaling traffic with multicasting in a wireless communication network.

2. Description of Related Art

Recent advances in wireless communication technology and associated communication protocols have enabled the development of a wide variety of wireless network configurations capable of operating in a wide variety of wireless environments. As a result, these wireless network configurations have enabled system administrators and network operators to offer voice and data communication services to mobile users that would be difficult or even impossible using convention wireline networks. Wireless Local Area Networks, for example, have enabled organizations to satisfy the communication needs of its increasingly mobile workforce by providing enterprise-wide access to voice and data networks via a wireless interface. Metropolitan Area Networks, on the other hand, have enabled network operators to provide wireless communication services to mobile users located within an entire metropolitan area, and Public Land Mobile Networks further enhance the performance and capabilities of wireless communication services by enabling network operators to cover an even larger geographic region.

Each of these wireless network configurations typically employ a common functional architecture based upon a conventional cellular structure. More particularly, these wireless networks typically divide the wireless coverage area into a number of smaller geographic regions, called cells, where each cell includes a base station for communicating with wireless communication devices located within the base station's assigned cell. The base stations further communicate with a mobile switching center which acts as an interface between the base stations and backbone networks, such as the Public Switched Telephone Network, the Integrated Services Digital Network and other nodes within the wireless network. The mobile switching center also plays a critical role in coordinating call connection and radio resource management functionalities between the mobile switching center and base stations located within the mobile switching center's Service Area. In this context, the mobile switching center is responsible for coordinating call set-up, call supervision and call release. The mobile switching center is also responsible for communicating signaling information to the base stations that coordinate, for example, paging of a target wireless communication device in response to an incoming call and in some implementations, handover of a wireless communication device between base stations located within the mobile switching center's Service Area.

One significant problem associated with these types of wireless networks is that the mobile switching center typically communicates signaling information to the base stations using a unicast communication scheme. This communication scheme requires that signaling information be communicated to each base station in a separate communication using each base station's associated network or host address. Although this communication scheme performs adequately for discrete communications between the mobile switching center and a single base station, the communication scheme becomes inefficient in situations where the mobile switching center must communicate the same signaling information to a relatively large group of base stations. For example, when the mobile switching center receives an incoming call addressed to a target wireless communication device, the mobile switching center must address a separate paging command to each base station located within a Location Area, which is typically the Location Area with which the target wireless communication device last performed a registration or location update procedure. If the Location Area includes, for example, three base stations, the mobile switching center must replicate the paging command and communicate a corresponding one of three replicated paging commands to the three base stations, even if the three paging commands traverse the same communication links between the mobile switching center and each of the three base stations. As a result, this communication scheme proves to be not only time-consuming, but also wastes precious processing resources of the mobile switching center that could be used to perform other tasks and increases the signaling load over the communication links between the mobile switching center and the base stations.

Therefore, in light of the deficiencies of existing communication schemes, there is a need for a mechanism that reduces signaling traffic communicated from a mobile switching center to a plurality of base stations.

SUMMARY OF THE INVENTION

The deficiencies of the prior art are overcome by the method, system and apparatus of the present invention. For example, as heretofore unrecognized, it would be beneficial to reduce signaling traffic communicated from a mobile switching center to a plurality of base stations by associating the plurality of base stations to form one or more multicast groups and by assigning a multicast group address to each multicast group for use in subsequent multicast communications to the plurality of base stations within each multicast group. A network interface associated with each of the plurality of base stations within each multicast group may be configured to filter signaling traffic for signaling information addressed to the host address associated with the base station and multicast messages addressed to the multicast group to which the base station belongs. The mobile switching center may then communicate signaling information to each-of the plurality of base stations within a multicast group by communicating a single multicast message using the multicast group's corresponding multicast group address.

If the mobile switching center and the base stations are located on different subnetworks, multicast-enabled routers may be connected between the mobile switching center and the plurality of base stations to ensure that multicast messages are only routed over communication links which include a corresponding multicast group member. These multicast-enabled routers may be configured as separate functional units, or alternatively, one or more network interfaces associated with the plurality of base stations may be configured with multicast-routing functionalities. Another alternative utilizes one or more filter switches which only forward multicast messages over communication links that include a corresponding multicast group member, thereby preventing unnecessary communication of the multicast message over communication links which do not include a corresponding multicast group member.

In one embodiment of the present invention, signaling traffic corresponding to paging commands communicated from the mobile switching center to the base stations located within the mobile switching center's Service Area is reduced by associating the plurality of base stations to form a multicast group for each Location Area and a separate multicast group for the Service Area. In response to an incoming call addressed to a target wireless communication device, the mobile switching center communicates a first paging command to the host address associated with the base station with which the wireless communication device last updated. If the target wireless communication device does not respond to the first page, the mobile switching center communicates a second paging command addressed to the multicast group associated with the Location Area in which the target wireless communication device last updated. If the target wireless communication device does not respond to the second page, the mobile switching center communicates a third paging command addressed to the multicast group associated with the Service Area.

The technical advantages of the present invention include, but are not limited to, the following exemplary technical advantages. It should be understood that particular embodiments may not involve any, much less all, of the following exemplary technical advantages.

An important technical advantage of the present invention is that it provides a mechanism for efficiently reducing signaling traffic communicated from the mobile switching center to a plurality of base stations.

Another important technical advantage of the present invention is that it enables the mobile switching center to quickly communicate signaling information to a plurality of base stations without requiring repeated communication of the same signaling information to each of the plurality of base stations.

Yet another important technical advantage of the present invention is the ability to reduce the signaling load on communication links between the mobile switching center and the plurality of base stations by enabling a single multicast message to be received by all multicast group members.

Yet another important technical advantage of the present invention is the ability to optimally route signaling information so that signaling information addressed to a multicast group does not traverse communication links that do not connect a corresponding multicast group member.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method, system and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular networks, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

Preferred embodiment(s) of the present invention and its advantages are best understood by referring to FIGS. 1–5 of the drawings, like numerals being used for like and corresponding parts of the various drawings. It should be emphasized that although the preferred embodiment (s) describe certain aspects of the present invention in the context of a cellular communication system implemented using a multicast-enabled Internet Protocol, the principles of the present invention are not limited to this specific implementation. Rather, persons of ordinary skill in the art will recognize that the principles of the present invention may be advantageously practiced in other wireless communication systems, such as Wireless Local Area Networks and Metropolitan Area Networks, which may employ a multicast-enabled Internet Protocol or a different multicast-enabled communications protocol. Therefore, the following description of the preferred embodiment(s) is for the purpose of illustration, and not limitation.

Figure 1:
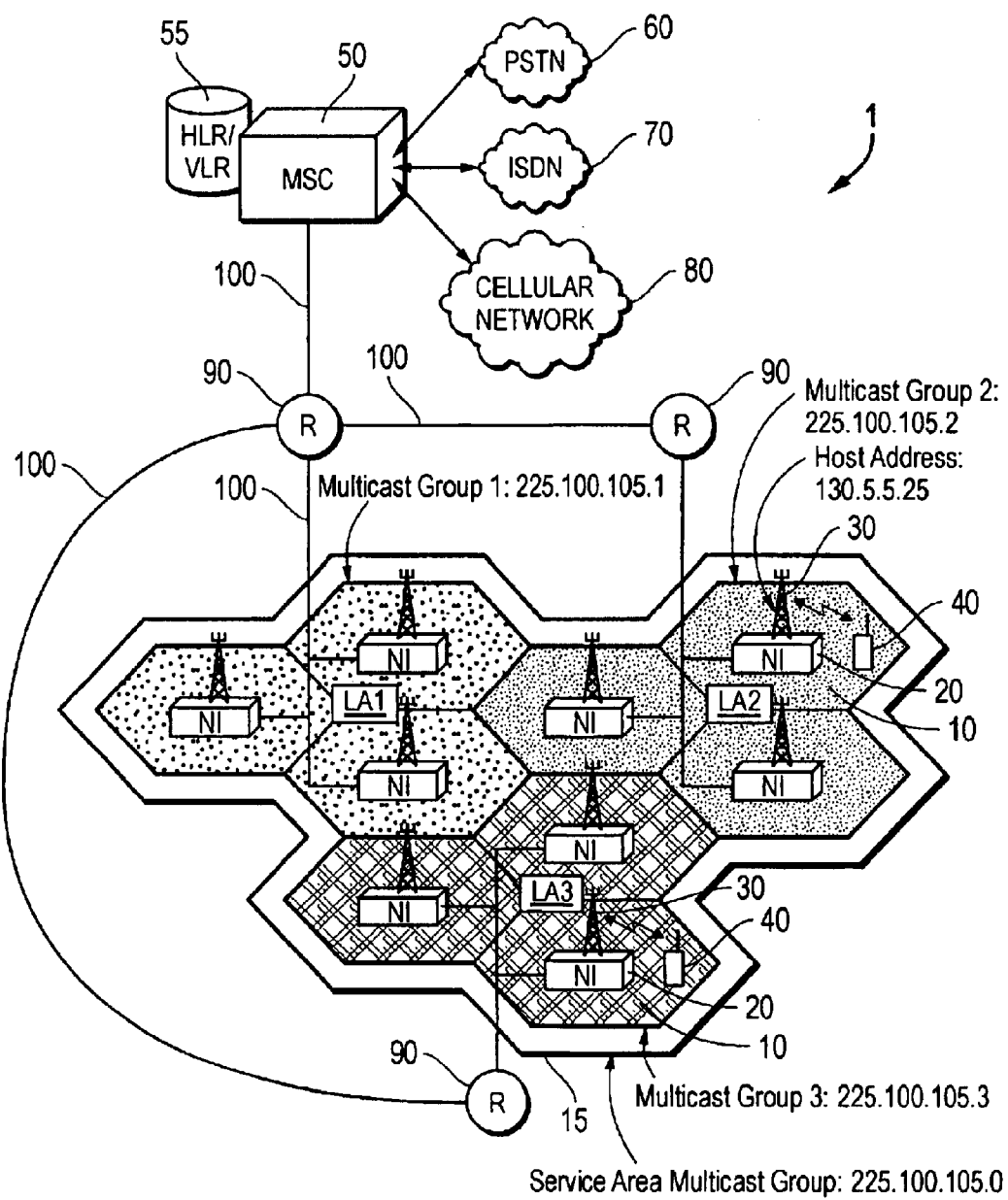
FIG. 1 illustrates a portion of an exemplary cellular system with which the principles of the present invention may be advantageously practiced.

Referring to FIG. 1, a portion of an exemplary cellular communication system with which the principles of the present invention may be advantageously practiced is depicted generally at 1. The exemplary cellular communication system divides the cellular coverage area into a plurality of individual cells 10, where each cell 10 includes a base station 30 for communicating with wireless communication devices 40, such as mobile stations or wireless data terminals, located within the base station's assigned cell 10. It should be noted that although the exemplary cellular communication system associates each base station 30 with a single assigned cell 10, the base stations 30 may be equipped with one or more directional antennas that enable the base stations 30 to be associated with a plurality of assigned cells 10. For example, the base stations 30 may be equipped three directional antennas that enable each base station 30 to communication with wireless communication devices 40 located within each of the base station's three assigned cells 10.

The base stations 30 of the exemplary cellular communication system also communicate with a mobile switching center 50 which acts as an interface between the base stations 30 and backbone networks, such as the Public Switched Telephone Network 60, the Integrated Services Digital Network 70 and other nodes within the cellular network 80. The mobile switching center 50 also communicates signaling information to the base stations 30 which coordinate, for example, call originating and terminating activities, paging of target wireless communication devices 40 in response to an incoming call and in some implementations, handover of wireless communication devices 40 between base stations 30 located within the mobile switching center's Service Area 15.

Unicast Communication Scheme

In accordance with one aspect of the present invention, the exemplary cellular system of FIG. 1 may be configured to communicate signaling information from the mobile switching center 50 to the base stations 30 utilizing a unicast communication scheme. One exemplary unicast communication scheme associates each base station 30 with a physical host address, such as an Internet Protocol address, that is used to uniquely identify each base station 30 within the cellular system. The mobile switching center 50 may then communicate signaling information to a particular base station 30 by addressing the signaling information using the particular base station's host address. A network interface 20 associated with each base station 30 filters signaling traffic communicated over communication links 100 for signaling information addressed to the network interface's associated base station 30. As a result, signaling information addressed to the particular base station 30 will be detected by the particular base station's associated network interface 20 and forwarded to the particular base station 30 for further processing.

If the mobile switching center 50 and the base stations 30 to which the mobile switching center 50 communicates are located on different subnetworks (e.g., identifiably separate portions of the network that represent all devices that are addressed from the network via the same network portion of an IP address and/or connected to the network via the same network hardware, such as, for example, all devices located at a geographic location or on the same Local Area Network), the exemplary cellular system of FIG. 1 may include routers 90 for routing signaling information from the mobile switching center 50 to the base stations 30. These routers 90 may utilize the host address associated with the signaling information (e.g., from an address header) in combination with routing information stored within the routers 90 to determine the appropriate communication links 100 over which to forward the signaling information so that the signaling information is received by the intended base station 30 (e.g., via the respective associated network interface 20).

It should be noted that although this exemplary unicast communication scheme performs adequately for discrete communications between the mobile switching center 50 and a single base station 30, the unicast communication scheme becomes inefficient in situations where the mobile switching center 50 must communicate the same signaling information to a plurality of base stations 30. The inefficiencies are primarily caused by the fact that the mobile switching center 50 must replicate the signaling information and individually address the communication to each of the plurality of base stations 30. Furthermore, the routers 90 must independently route each communication from the mobile switching center 50 to each of the plurality of base stations 30, even if the communications traverse the same communication links 100. If the mobile switching center 50 must communicate the same signaling information to a relatively large group of base stations 30, the unicast communication scheme not only proves to be time-consuming, but also wastes precious processing time of the mobile switching center 50 and causes an increase in the signaling load over the communication links 100.

Multicast Communication Scheme

One objective of the present invention is to reduce signaling traffic communicated from a mobile switching center 50 to a plurality of base stations 30 by implementing a multicast communication scheme either alone or in combination with a unicast communication scheme. In accordance with this aspect of the present invention, the multicast communication scheme is essentially implemented by associating a plurality of base stations 30 to form one or more multicast groups and assigning a multicast group address to each multicast group for use in subsequent multicast communications to the plurality of base stations 30 within each multicast group.

Forming Multicast Groups

Each multicast group preferably includes base stations 30 to which the mobile switching center 50 frequently communicates the same or related signaling information. In the exemplary cellular system of FIG. 1, for example, the base stations 30 are associated to form a multicast group for each Location Area LA1–LA3, and a separate multicast group for the mobile switching center's Service Area 15. It should be noted, however, that other multicast group configurations are contemplated and embraced by the present invention, either alone or in combination with the above exemplary configurations. For example, a multicast group may be formed for a cluster of neighboring base stations 30, for base stations 30 that occupy the same relative cell location within a Location Area or cluster, for base stations 30 that are allocated the same frequency channels, for base stations 30 that are controlled by the mobile switching center 50 in a similar manner, etc. Furthermore, each base station 30 may belong to multiple multicast groups, and the multicast groups may be dynamically altered in response to certain conditions, such as a change in the cell plan or a change in signaling requirements of the base stations 30 within the mobile switching center's Service Area Addressing of Multicast Groups Once the multicast groups have been determined, a multicast group address is assigned to each multicast group for use in subsequent multicast communications to the plurality of base stations 30 within each multicast group. These multicast group addresses differ from conventional host addresses in that a multicast group address is not a physical address that identifies a particular base station 30. Rather, multicast group addresses are logical addresses that are used to identify a particular communication session between the mobile switching center 50 and the base stations 30 within a multicast group. Because a preferred embodiment of the present invention utilizes a multicast-enabled Internet Protocol, these multicast group addresses may be configured as Class D Internet Protocol addresses, which essentially comprise a specified range of Internet Protocol addresses that are designated for multicast applications. In Internet standard "dotted decimal" notation, these Class D Internet Protocol addresses range from 224.0.0.0 to 239.255.255.255. In practice, the mobile switching center 50 may be allocated a range of multicast group addresses which the mobile switching center 50 may use to dynamically assign multicast group addresses to the multicast groups in accordance with maintenance or operational programming. Alternatively, network operators may assign the multicast group addresses to the multicast groups at, for example, a time when the cell plan is implemented, modified, etc.

Configuring Network Interfaces

Before the mobile switching center 50 may communicate multicast messages to a multicast group, the network interfaces 20 associated with the base stations 30 within the multicast group should be configured to receive multicast messages addressed to the multicast group. This procedure may include configuring the hardware or software filters of the network interfaces 20 to filter signaling traffic for multicast messages addressed to the multicast group to which the base station 30 belongs. In accordance with one aspect of the present invention, the configuration of the network interfaces 20 is accomplished in response to a signaling command from the mobile switching center 50 to the base stations 30 within the multicast group where the signaling command informs the base stations 30 of the multicast group address and instructs the base stations 30 to configure their associated network interfaces 20 to filter signaling traffic for multicast messages addressed to the multicast group. If the mobile switching center 50 and the base stations 30 within the multicast group are located on the same subnetwork (which is common in smaller networks, such as Wireless Local Area Networks), the mobile switching center 50 may then communicate multicast messages to the multicast group using the same "Send IP" operation used for unicast messages, except that the mobile switching center 50 specifies the desired multicast group address as the destination address.

Configuring Routers/Filter Switches

If the mobile switching center 50 and the base stations 30 within the multicast group are located on different subnetworks, however, routers 90 between the mobile switching center 50 and the base stations 30 should be configured with multicast routing capabilities to enable the routers 90 to route multicast messages. The routers 90 should also be informed of new multicast groups and changes to the membership of existing multicast groups in order to route the multicast messages over the appropriate communication links 100.

One embodiment of the present invention utilizes existing Internet Group Management Protocol procedures to inform the routers 90 of multicast group membership. In accordance with this embodiment, the signaling command from the mobile switching center 50 to the base stations 30 within a multicast group also instructs the base stations 30 to perform an IGMP "request to join" procedure. This "request to join" procedure basically informs the base station's associated router 90 that there exists a multicast group member having a specified multicast group address on the router's subnetwork. The associated router 90 then updates its routing tables and informs its neighboring routers 90 of the current state of the network from the associated router's point of view. The neighboring routers 90 update their routing tables and inform their neighboring routers 90 and so on until the information regarding multicast group membership is eventually propagated to all routers 90 within the mobile switching center's Service Area. The routers 90 use this multicast group membership information to determine optimal transmission paths for forwarding multicast messages across the network in accordance with a multicast routing protocol, such as Distance Vector Multicast Routing Protocol, Multicast Open Shortest Path First, Protocol-Independent Multicast and Core Base Trees, the implementation of which is well known in the art. It should be noted, however, that these exemplary routing protocols essentially ensure that multicast messages do not traverse communication links 100 that do not connect a corresponding multicast group member, thereby minimizing the signaling load on the communication links 100.

In accordance with an alternative embodiment, the mobile switching center 50 informs the routers 90 of the membership of each multicast group and the corresponding multicast group addresses. The mobile switching center 50 can perform this function by individually communicating the information to each router 90 within the mobile switching center's Service Area 15. Alternatively, the mobile switching center 50 communicates the information in a single multicast message addressed to "224.0.0.2", which is a special Class D Internet Protocol address for communicating with all routers on the local network. The routers 90 may then update their routing tables and determine optimal transmission paths in accordance with one of the above-mentioned multicast routing protocols.

Figure 2:
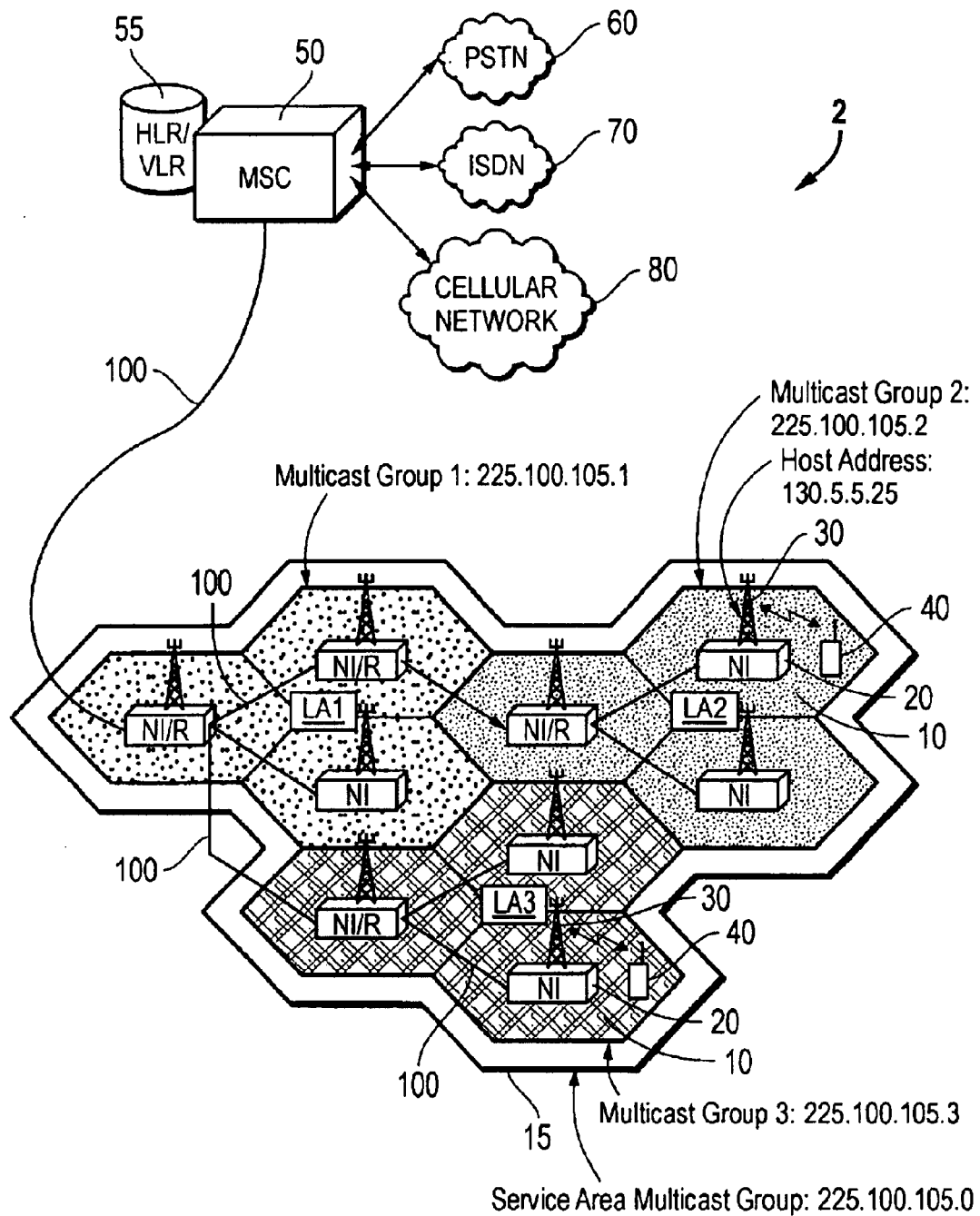
FIG. 2 illustrates an exemplary alternative configuration of the exemplary cellular system that incorporates router functionalities within one or more network interfaces associated with the base stations in accordance with the present invention.

It should be noted that the multicast-enabled routers 90 described above may be configured as separate functional units, or alternatively, one or more network interfaces 20 associated with the base stations 30 may be configured with multicast routing functionalities. FIG. 2 illustrates generally at 2 an exemplary alternative configuration of the exemplary cellular system that incorporates router functionalities within one or more network interfaces 20 associated with the base stations 30 in accordance with the present invention. In the exemplary cellular system of FIG. 2, the network interfaces 20 that connect one or more additional base stations 30 to the mobile switching center 50 are configured with multicast routing functionalities as illustrated by the NI/R designation. This alternative approach to routing multicast messages essentially utilizes one of the above-described procedures for configuring multicast-enabled routers 90 to route multicast messages, except that the base stations 30 within the multicast group or the mobile switching center 50 inform the network interfaces 20 having multicast routing functionalities of multicast group membership and corresponding multicast group addresses. One advantage of this approach is that it enables the base stations 30 to be configured in a wider variety of network topologies. For example, in the exemplary cellular system of FIG. 2, the base stations 30 are configured in a cascaded star topology commonly employed in some cellular systems. However, it should be noted that other network topologies are possible using the approach. Another advantage of incorporating routing functionalities in one or more of the network interfaces 20 is that the principles of the present invention may be advantageously practiced in cellular systems without requiring separate multicast-enabled routers 90.

Figure 3:
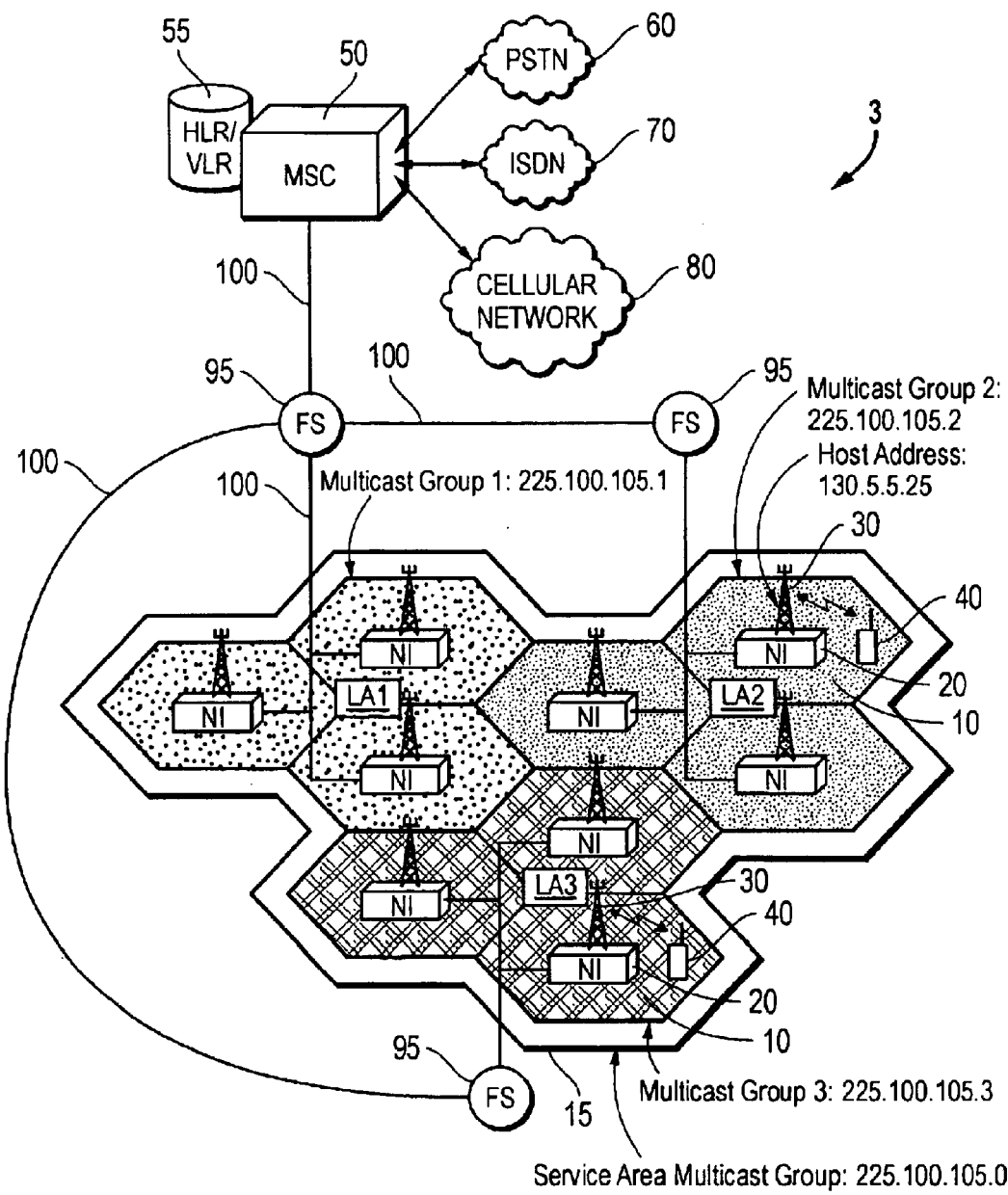
FIG. 3 illustrates another exemplary alternative configuration of the exemplary cellular system that incorporates filter switches to route signaling traffic addressed to a multicast group in accordance with the present invention.

Referring to FIG. 3, another exemplary alternative configuration of the exemplary cellular system that incorporates filter switches 95 to route signaling traffic addressed to a multicast group in accordance with the present invention is illustrated generally at 3. This alternative approach differs from the approaches described above in that this approach utilizes relatively simple filter switches 95. These filter switches 95 are multicast-aware and can be configured by the mobile switching center 50 or network operators to automatically filter multicast messages so that the multicast messages are only forwarded over communication links 100 that connect a corresponding multicast group member. Consequently, the filter switches 95 provide many of the same benefits as multicast-enabled routers 90, but with simpler and cheaper hardware.

Methods for Reducing Signaling Traffic

Figure 4:
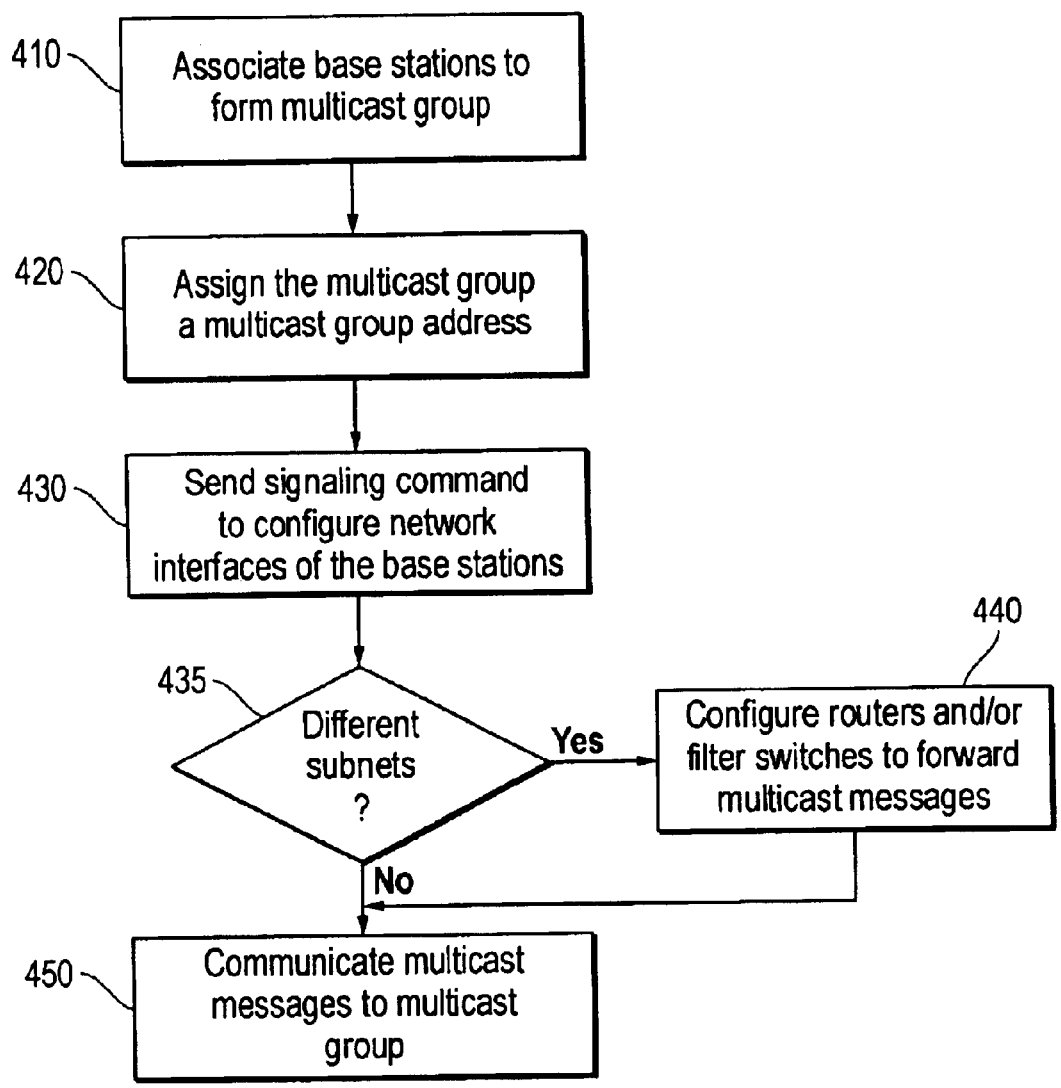
FIG. 4 illustrates an exemplary method in flow chart form with which the principles of the present invention may be advantageously practiced.

Referring to FIG. 4, an exemplary method in flow chart form with which the principles of the present invention may be advantageously practiced is depicted generally at 400. At step 410, a plurality of base station 30 are associated to form a multicast group. As mentioned previously, the multicast group preferably includes base stations 30 to which the mobile switching center 50 frequently communicates the same or related signaling information, such as, for example, base stations 30 within a single Location Area. The multicast group is then assigned a multicast group address at step 420 which may be selected, for example, from the range of addresses within the available group of Class D Internet Protocol addresses. At step 430, the mobile switching center 50 sends a signaling command to each base station 30 within the multicast group informing the base stations 30 of the multicast group's associated multicast group address and instructing the base stations 30 to configure their associated network interfaces 20 to filter for multicast messages addressed to the multicast group. If the mobile switching center 50 and the base stations 30 within the multicast group are located on the same subnetwork (as depicted by the "N" branch of decision block 435), the mobile switching center 50 may then communicate multicast messages to the base stations 30 within the multicast group using the multicast group's associated multicast group address at step 450.

If the mobile switching center 50 and the base stations 30 within the multicast groups are located on different subnetworks (as depicted by the "Y" branch of decision block 435), routers 90 and/or filter switches 95, etc. connected between the mobile switching center 50 and the base stations 30 are configured to forward multicast messages to the base stations 30 within the multicast group at step 440. Implementation of the step 440 may employ any one of the above-described procedures for configuring routers 90 and/or filter switches 95. Once the routers 90 and/or filter switches 95 have been configured, the mobile switching center 50 may then communicate multicast messages to the base stations 30 within the multicast group at step 450.

Methods for Reducing Paging Commands

Figure 5:
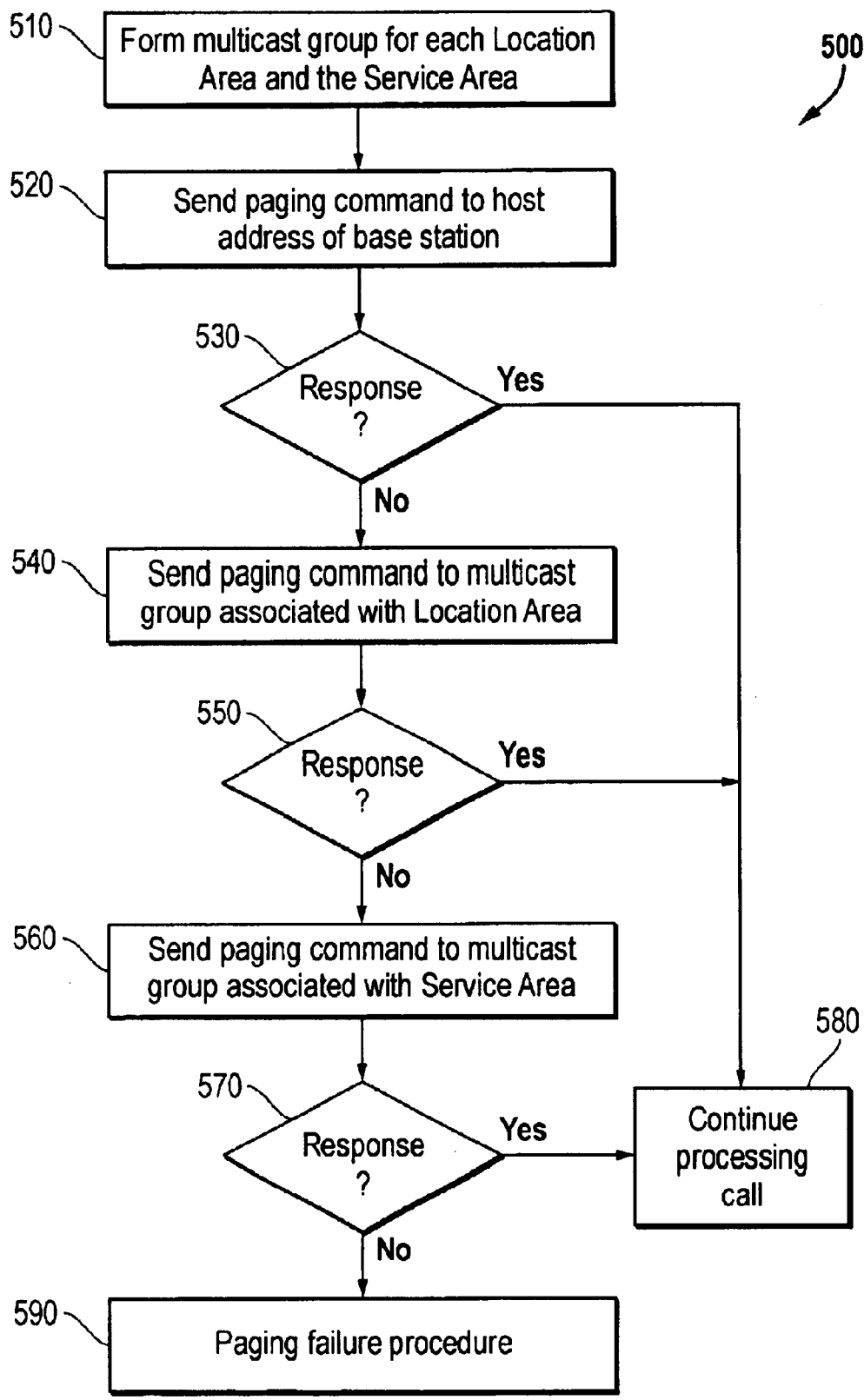
FIG. 5 illustrates an exemplary method in flow chart form for reducing signaling traffic corresponding to paging commands communicated from the mobile switching center to base stations within the mobile switching center's Service Area in accordance with the present invention.

Referring to FIG. 5, an exemplary method in flow chart form for reducing signaling traffic corresponding to paging commands communicated from the mobile switching center 50 to base stations 30 within the mobile switching center's Service Area 15 in accordance with the present invention is illustrated generally at 500. This exemplary method reduces the signaling traffic by forming a multicast group for each Location Area LA1–LA3 and a separate multicast group for the Service Area 15 at step 510. In response to an incoming call addressed to a target wireless communication device 40, the mobile switching center 50 communicates a first paging command to the host address associated with the base station 30 with which the target wireless communication device 40 last updated at step 520. The base station 30 with which the target wireless communication device 40 last updated, as well as an indication of the Location Area and Service Area mentioned below, may be stored in the Home Location Register/Visitor Location Register 55 coupled to the mobile switching center 50, where the information is stored in response to a prior registration or location update of the target wireless communication device 40 with the cellular system.

If the target wireless communication device 40 does not respond to the first page at step 530, the mobile switching center 50 communicates a second paging command addressed to the multicast group associated with the Location Area in which the target wireless communication device 40 last updated at step 540. If the target wireless communication device 40 does not respond to the second page at step 550, the mobile switching center 50 communicates a third paging command addressed to the multicast group associated with the Service Area 15 at step 560. If the target wireless communication device 40 responds to any one of the pages, processing of the call continues at step 580 and the exemplary paging method terminates at that point. Conversely, if the wireless communication device 40 does not respond to any of the pages, an appropriate paging failure procedure may be performed at step 590.

The paging failure procedure may include sending a signal from the mobile switching center 50 to other nodes within the Public Switched Telephone Network 60, the Integrated Services Digital Network 70 or cellular network 80 indicating that the wireless communication device 40 could not be located. This signal may further initiate appropriate call "tear down" procedures which free resources that were used to process the original call. Alternatively, the cellular system may attempt to page the target wireless communication device 40 in one or more secondary Service Areas that may be stored within the Home Location Register/Visitor Location Register 55 associated with the target wireless communication device 40. For example, these secondary Service Areas may include the target wireless communication device's Home Service Area, the Service Area that includes the residence of the user of the target wireless communication device 40, the Service Area that includes the workplace of the user of the target wireless communication device 40, the Service Area in which the target wireless communication 40 is statistically likely to be located based on the historical roaming patterns of the target wireless communication device 40, etc. The mobile switching center 50 associated with the secondary Service Area 15 may then attempt to locate the target wireless communication device 40 by multicasting a paging command to the plurality of base stations 30 within the secondary Service Area 15 using the multicast group address assigned to the plurality of base stations 30 within the secondary Service Area 15.

Although preferred embodiment(s) of the method, system and apparatus of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for reducing signaling traffic communicated from a mobile switching center to a plurality of base stations, the method comprising the steps of:

associating the plurality of base stations to form a multicast group for each Location Area within the mobile switching center's Service Area assigning a corresponding multicast group address to each of the one or more multicast groups for use in multicast communications to the plurality of base stations within the one or more multicast groups; and communicating, in response to an incoming call to a target wireless communication device, a first paging command to the multicast group associated with a Location Area in which the target wireless communication device last updated.

2. The method of claim 1, wherein the step of associating further comprises associating the plurality of base stations to form a second multicast group for base stations within a Service Area.

3. The method of claim 1, wherein the step of associating comprises associating at least one of the plurality of base stations with two or more multicast groups.

4. The method of claim 1, wherein the step of assigning comprises assigning a Class D Internet Protocol address to each of the one or more multicast groups.

5. The method of claim 1, further comprising the step of configuring network interfaces associated with the plurality of base stations within each of the one or more multicast groups to receive multicast messages addressed to each base station's associated multicast group.

6. The method of claim 5, wherein the step of configuring is performed in response to a signaling command from the mobile switching center informing the plurality of base stations within each of the one or more multicast groups of the corresponding multicast group address.

7. The method of claim 5, further comprising the step of configuring routers connected between the mobile switching center and the plurality of base stations to route multicast messages to the plurality of base stations within each of the one or more multicast groups.

8. The method of claim 7, wherein the step of configuring routers is performed in response to multicast group membership information received by the routers from the plurality of base stations.

9. The method of claim 7, wherein the step of configuring routers is performed in response to multicast group membership information received by the routers from the mobile switching center.

10. The method of claim 5, further comprising the step of configuring filter switches connected between the mobile switching center and the plurality of base stations to only forward multicast messages over communication links that connect a corresponding multicast group member.

11. The method of claim 1, wherein the step of associating further comprises associating the plurality of base stations to form a separate multicast group for the Service Area, and further comprising the step of:

communicating a second paging command to the separate multicast group associated with the Service Area if the first page is unsuccessful.

12. The method of claim 1, further comprising the steps of:

communicating, in response to an incoming call to a target wireless communication device, a first paging command to a base station with which the target wireless communication device last updated; and communicating a second paging command to the multicast group associated with the Location Area in which the target wireless communication device last updated, if the first page is unsuccessful.

13. The method of claim 12, wherein the step of associating further comprises associating the plurality of base stations to form a separate multicast group for the Service Area, and further comprising the step of:

communicating a third paging command to the separate multicast group associated with the Service Area if the second page is unsuccessful.

14. A system for reducing signaling traffic communicated from a mobile switching center to a plurality of base stations, the system comprising:

a plurality of base stations associated together to form a first multicast group for base stations within a Location Area, the plurality of base stations are further associated together to form a second multicast group for base stations within a Service Area, wherein at least one of the plurality of base stations is associated with two or more multicast groups, each of the first and second multicast groups having an associated multicast group address;

a network interface associated with individual ones of the plurality of base stations for filtering signaling traffic for multicast messages addressed to the multicast group to which the network interface's associated base station belongs; and a mobile switching center configured to communicate the multicast messages to the plurality of base stations within the one or more multicast groups using each multicast group's associated multicast group address.

15. The system of claim 14, wherein the plurality of base stations are associated together to form a multicast group for a cluster of neighboring base stations.

16. The system of claim 14, wherein the multicast group addresses comprise Class D Internet Protocol addresses.

17. The system of claim 14, wherein the network interfaces associated with the plurality of base stations are configured to filter for multicast messages in response to a signaling command from the mobile switching center informing the network interface's associated base station of the multicast group's associated multicast group address.

18. The system of claim 17, wherein one or more of the network interfaces include multicast routing capabilities.

19. The system of claim 14, further comprising multicast-enabled routers connected between the mobile switching center and the plurality of base stations for routing the multicast messages.

20. The system of claim 19, wherein the multicast-enabled routers are configured to route the multicast messages in response to multicast group membership information received by the multicast-enabled routers from the plurality of base stations.

21. The system of claim 19, wherein the multicast-enabled routers are configured to route the multicast messages in response to multicast group membership information received by the multicast-enabled routers from the mobile switching center.

22. The system of claim 14, further comprising filter switches connected between the mobile switching center and the plurality of base stations for forwarding the multicast messages only over communication links that connect a corresponding multicast group member.

23. The system of claim 14, wherein the plurality of base stations are associated together to form a multicast group for each Location Area within the mobile switching center's Service Area, and wherein the mobile switching center, in response to an incoming call addressed to a target wireless communication device, communicates a first paging command addressed to the multicast group associated with the Location Area in which the target wireless communication device last updated.

24. The system of claim 23, wherein the plurality of base stations are associated together to form a separate multicast group for the Service Area, and wherein the mobile switching center communicates a second paging command addressed to the separate multicast group associated with the Service Area if the first page is unsuccessful.

25. The system of claim 23, wherein the mobile switching center, prior to communicating the first paging command, communications a paging command to a particular base station with which the target wireless communication device last updated.

26. An apparatus for reducing signaling traffic, the apparatus comprising:

a base station configured to be a member of a first multicast group associated with a Location Area and further configured to be a member of a second multicast group associated with a Service Area; and a network interface coupled to the base station, the network interface configured to filter signaling traffic for multicast messages addressed to each multicast group address associated with the one or more multicast groups.

27. The apparatus of claim 26, wherein the network interface is configured to filter signaling traffic for a particular multicast group address in response to a signaling command from the mobile switching center.

28. The apparatus of claim 27, wherein the signaling command includes the particular multicast group address.

29. The apparatus of claim 26, wherein the network interface includes multicast routing functionalities.

30. A method for reducing signaling traffic communicated from a mobile switching center to a plurality of base stations, the method comprising the steps of:

receiving a communication intended for a wireless communication device; and communicating a first paging command to a plurality of base stations associated with a Location Area using a multicast group address assigned to the plurality of base stations within the Location Area, the first paging command instructing the plurality of base stations to perform a first page for the wireless communication device; and communicating, if the first page is unsuccessful, a second paging command to a second plurality of base stations using a second multicast group address assigned to the second plurality of base stations.

31. The method of claim 30, wherein the Location Area comprises a particular Location Area in which the wireless communication device last registered.

32. The method of claim 30, wherein the second plurality of base stations are associated with a Service Area, and wherein the second multicast group address is assigned to the second plurality of base stations within the Service Area.

33. The method of claim 32, wherein the second plurality of base stations associated with the Service Area includes the plurality of base stations associated with the Location Area.

34. The method of claim 30, wherein the second plurality of base stations are associated with a secondary Service Area, and wherein the second multicast group address is assigned to the second plurality of base stations within the secondary Service Area.

35. The method of claim 34, wherein the second plurality of base stations associated with the secondary Service Area do not include the plurality of base stations associated with the Location Area.

36. The method of claim 30, further comprising the step of sending, prior to the step of communicating the first paging command, a paging command to a particular base station with which the wireless communication device last registered.

37. The method of claim 36, wherein the step of communicating the first paging command is performed in response to the wireless communication device failing to respond to the page from the particular base station.

* * * * *